United States Patent [19]

Amborn et al.

[11] Patent Number: 5,232,417
[45] Date of Patent: Aug. 3, 1993

[54] DIFFERENTIAL DRIVE

[75] Inventors: Peter Amborn, Neunkirchen-Seelscheid; Wolfgang Hildebrandt, Lohmar, both of Fed. Rep. of Germany

[73] Assignee: Viscodrive GmbH, Lohmar, Fed. Rep. of Germany

[21] Appl. No.: 995,346

[22] Filed: Dec. 22, 1992

Related U.S. Application Data

[63] Continuation of Ser. No. 690,532, Apr. 23, 1991, abandoned.

[30] Foreign Application Priority Data

Apr. 25, 1990 [DE] Fed. Rep. of Germany ....... 4013200

[51] Int. Cl.$^5$ .................... F16H 1/42; F16H 57/02; F16H 57/08
[52] U.S. Cl. .................... 475/252; 475/248; 475/331; 475/334; 475/346
[58] Field of Search .............. 475/248, 252, 331, 334, 475/346, 226, 227, 228

[56] References Cited

U.S. PATENT DOCUMENTS

| RE. 12,966 | 6/1909 | Mooers | 475/252 |
|---|---|---|---|
| 799,778 | 9/1905 | Cullman | 475/252 |
| 1,409,535 | 3/1922 | Elbertz | 475/252 |
| 2,000,223 | 5/1935 | Du Pras | 475/252 |
| 2,382,846 | 8/1945 | Barber | 475/346 X |
| 3,060,765 | 10/1962 | Rinsoz | 475/252 |
| 3,292,456 | 12/1966 | Saari | 475/226 |
| 3,375,736 | 4/1968 | Saari | 475/252 |
| 3,738,192 | 6/1973 | Belansky | 475/252 X |
| 3,768,336 | 10/1973 | Wharton | 475/252 |
| 4,092,878 | 6/1978 | Campbell | 475/346 X |
| 4,211,451 | 7/1980 | Shepard | 475/346 X |
| 4,440,042 | 4/1984 | Holdeman | 475/346 X |
| 4,455,889 | 6/1984 | Hauser | 475/346 X |
| 4,677,876 | 7/1987 | Dissett | 475/226 |
| 4,805,487 | 2/1989 | Pedersen | 475/226 |
| 4,950,215 | 8/1990 | Korner et al. | 475/252 |

FOREIGN PATENT DOCUMENTS

| 27647 | 9/1987 | Austria . | |
| 0356401 | 2/1990 | European Pat. Off. . | |
| 1136585 | 9/1962 | Fed. Rep. of Germany . | |
| 3707872 | 3/1988 | Fed. Rep. of Germany . | |
| 2-66342 | 3/1990 | Japan | 475/227 |
| 579480 | 11/1977 | U.S.S.R. | 475/252 |
| 1099717 | 1/1968 | United Kingdom . | |
| 1539941 | 2/1979 | United Kingdom . | |
| 2229237 | 3/1989 | United Kingdom | 475/252 |

*Primary Examiner*—Leslie A. Braun
*Assistant Examiner*—David E. Henn
*Attorney, Agent, or Firm*—Harness, Dickey & Pierce

[57] ABSTRACT

A differential drive has a drive housing in which a drivable differential carrier (1) is rotatably supported. The differential carrier accommodates straight-toothed and helically toothed output gears (4, 5). The gears (4, 5) are connected to each other via differential gears (12, 13). A first group of differential gears (12) engages one of the output gears (4), with a second group of differential gears (13) engaging the other output gear (5). Each of the differential gears (12) of the one group engage at least one of the differential gears (13) of the other group. The teeth of the output gears (4, 5) are held in cylindrical apertures (6, 7) of the differential carrier (1). Also, the differential carrier, at least at one end, is indirectly supported in the drive housing via one of the output gears (4) or an output shaft (24) connected thereto.

22 Claims, 3 Drawing Sheets

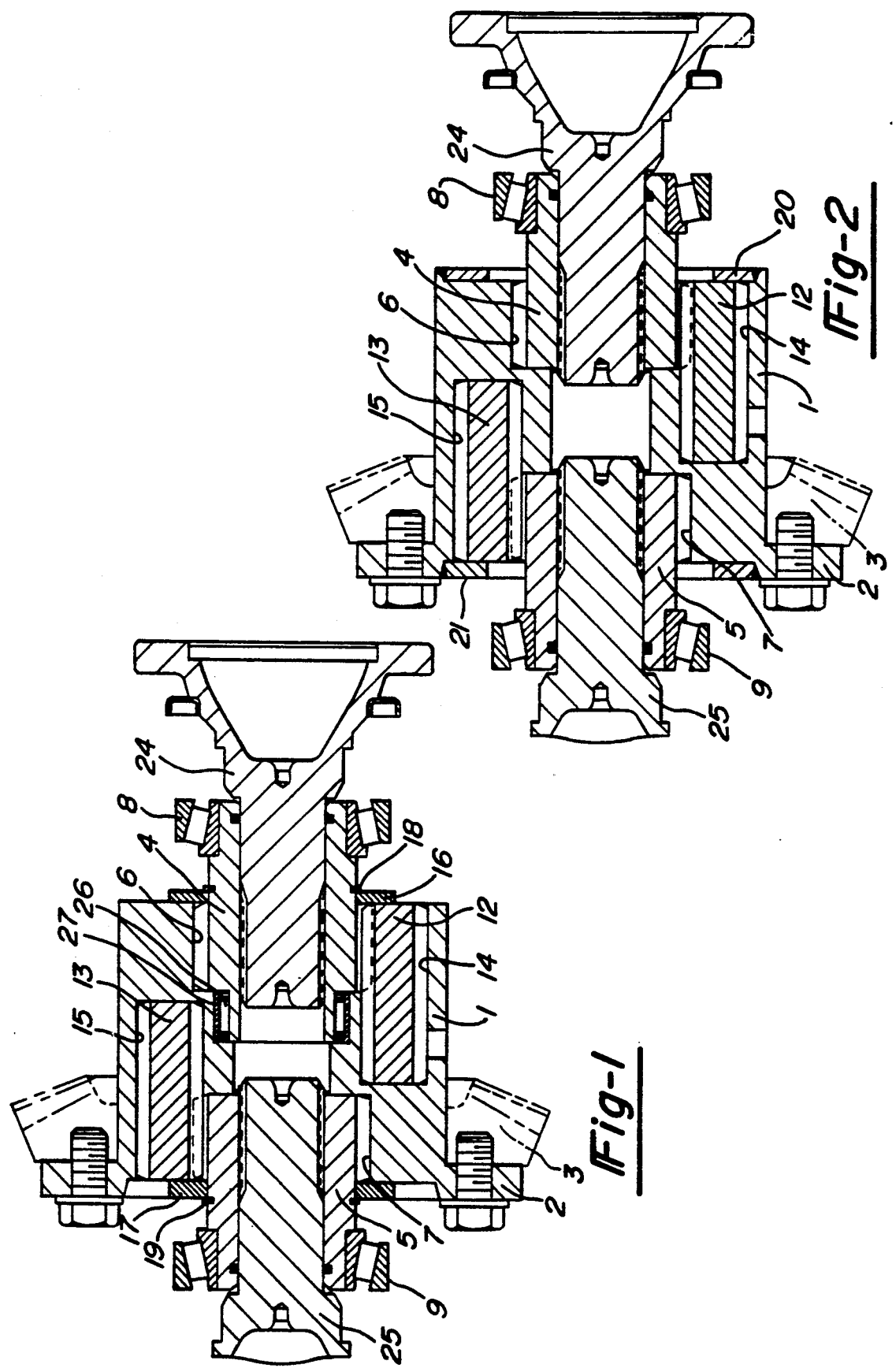

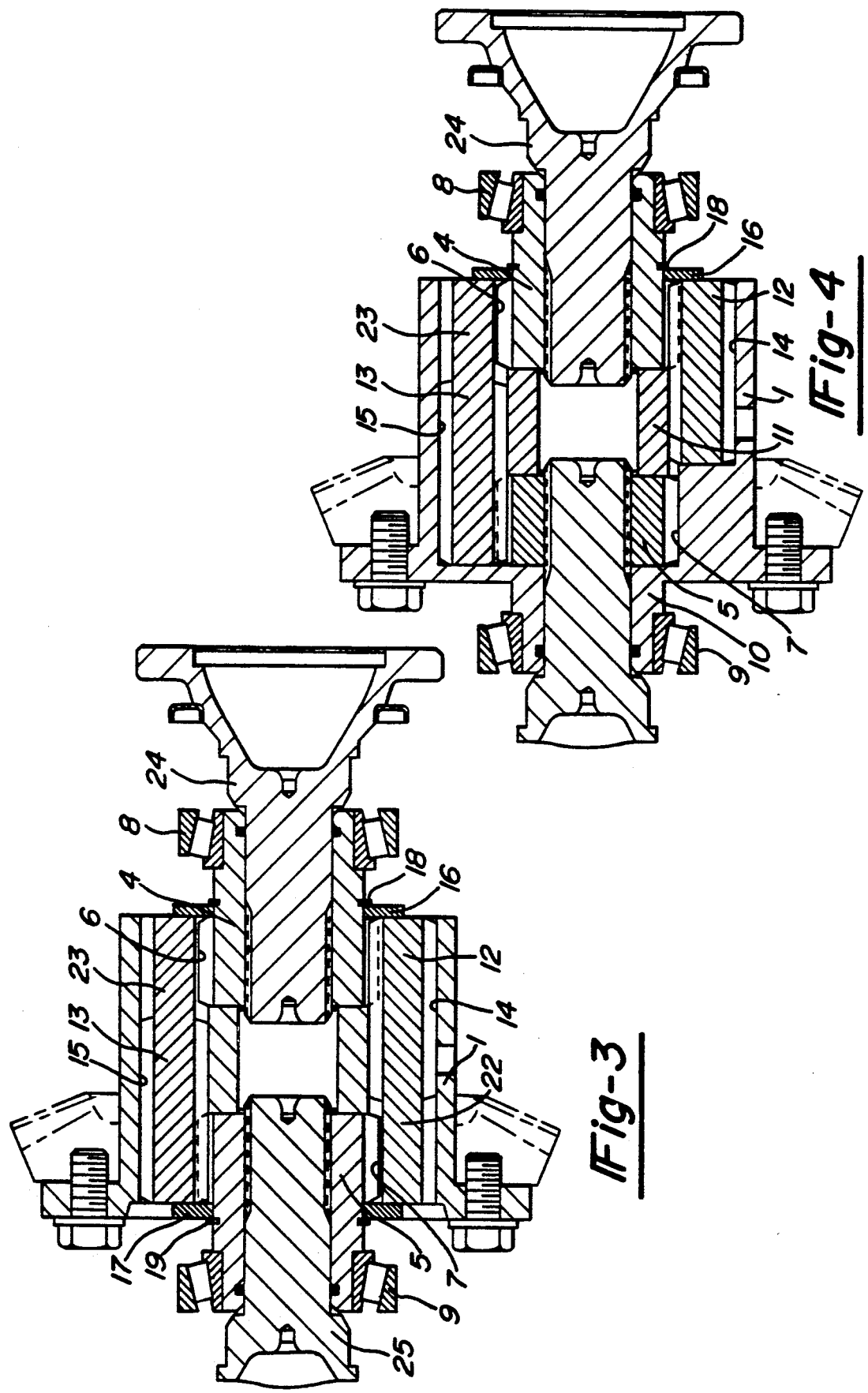

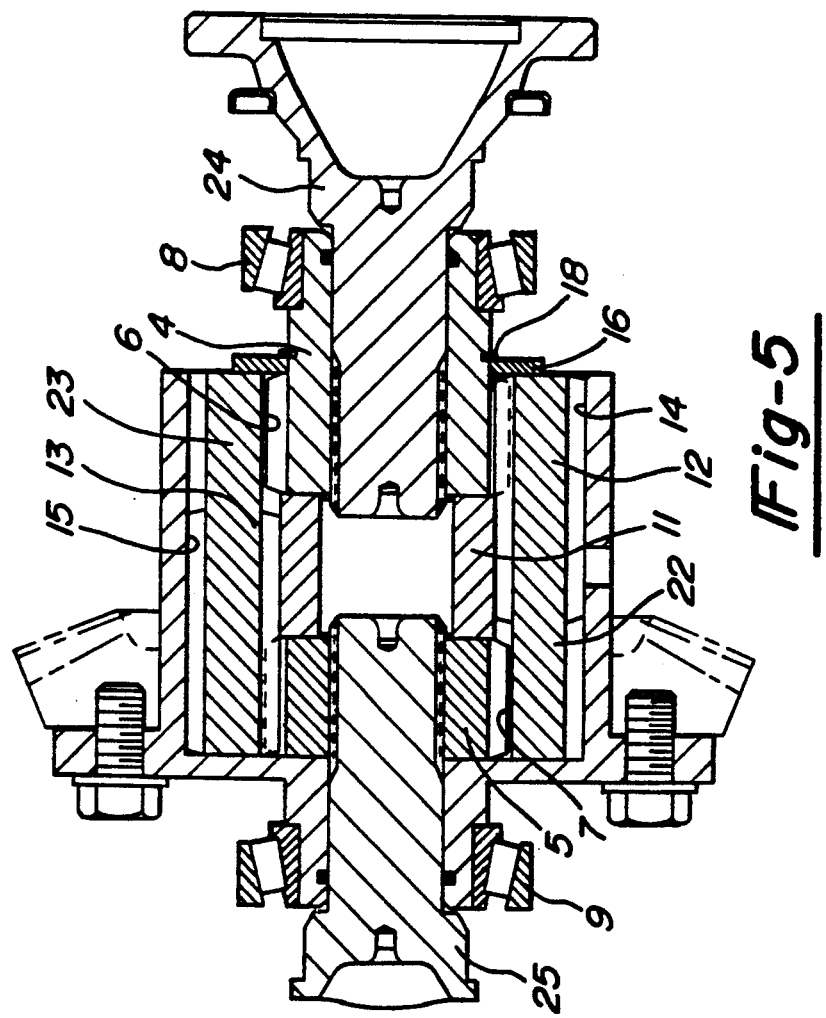

DIFFERENTIAL DRIVE

This application is a continuation of U.S. patent application Ser. No. 07/690,532, filed on Apr. 23, 1991, now abandoned.

BACKGROUND OF THE INVENTION

The invention relates to a differential drive having a drive housing with a rotatably supported drivable differential carrier. The differential carrier accommodates straight-toothed and helically toothed output gears. The output gears are connected to each other via differential gears. The differential gears are on an axis parallel to the axis of the output gears with a first group of differential gears engaging one of the output gears and a second group of differential gears engaging the other output gear. Each of the differential gears of one group engages at least one of the differential gears of the other group. The tooth heads of the output gears are held in cylindrical apertures of the differential carrier.

Differential drives of this type are known from GB 1 099 717. These differential carriers consists of several parts and include covers provided with projections for receiving roller bearings. The differential carrier is thus doubly supported in the drive housing. These carriers require a large number of parts and a centering means provided at the projections relative to the central carrier part and the bearing seat which make them expensive to produce.

SUMMARY OF THE INVENTION

It is an object of the present invention to reduce the weight of the differential drive, to reduce the axial length of the differential carrier and to facilitate its machining. The objective is achieved by the differential carrier, at at least one end, being indirectly supported in the housing via one of the output gears or an output shaft. Indirectly supporting the differential carrier in the drive housing, via at least one of the output gears, substantially simplifies the design and machining of the differential carrier. Thus, the carrier no longer has to be provided with the respective bearing seats and may be provided with bores. In a preferred embodiment, the differential carrier is indirectly supported in the drive housing via both output gears. As a result of the indirect support of the differential carrier, the cover may be eliminated at the respective end. Instead, axial security of the output gears is ensured by the respective bearing, whereas axial security of the differential gears is ensured by simple annular members jointly holding the differential gears.

The differential carrier is radially floatingly held on the output gears which, in a preferred embodiment, additionally support each other or they are supported inside the differential carrier. The output gears may be designed as sun gears or the like. The radial components of the tooth forces originating from the driving torque, via a crown gear or the like, lead to a pressure force between the output gears and the differential carrier. The pressure force rotates relative to the differential carrier. In the case of a speed differential between the output gears, the pressure force exerts a considerable self-inhibiting effect. To the extent that the differential gears are also held directly on their tooth heads in apertures in the differential carrier, additional friction forces occur.

The apertures for the differential gears as well as those for the output gears may be designed as through-apertures. In an advantageous embodiment an intermediate sleeve may be pressed inwardly to axially fix the differential gears.

Alternatively, and in an equally simple embodiment, the apertures for the differential gears and output gears may be designed as blind holes introduced from both ends.

Finally it is possible to design the apertures as blind holes from only one end of the differential carrier. In this embodiment, a spacing sleeve is introduced for the output gears and the blind holes for the differential gears are given different depths.

To the extent that the differential gears are provided with through-apertures or a group of deep blind holes, it is possible to use differential gears whose toothed region covers only part of their length. In addition, the differential gears include extending journals to provide axial support in the region of the end faces of the differential carrier.

According to a first advantageous embodiment, the differential gears may be supported axially outwardly on discs or sleeves axially fixed on the output gears, with this arrangement including support relative to the inner race of the bearing of the respective output gear.

According to a second simple embodiment, axially outwardly corresponding annular discs of the differential gears are fixed in the differential carrier to insure axial support.

If helical teeth are used, generating an axial component acting on the output gears, it is advantageous to design the teeth in such a way that under normal operating conditions, the axial component points axially inwardly towards the differential carrier. In the case of torque reversal, the axial component points outwardly and is supported on the bearings in a friction-reducing way. This is advantageous for largely eliminating the self-inhibiting effect of the differential drive in the case of torque reversal which effect is required for the braking behavior of vehicles equipped with ABS systems.

From the following detailed description taken in conjunction with the accompanying drawings and subjoined claims, other objects and advantages of the present invention will become apparent to those skilled in the art.

BRIEF DESCRIPTION OF THE DRAWINGS

Below the invention will be explained with reference to five embodiments illustrated in the drawings wherein FIG. 1 shows a first embodiment of a differential carrier of a differential drive with bearing in accordance with the invention, having blind holes for the output and differential gears bored from two ends.

FIG. 2 illustrates a second embodiment of a differential carrier of a differential drive with bearing in accordance with the invention, with the differential gears being fixed in a different way.

FIG. 3 shows a third embodiment of a differential carrier of a differential drive with bearing in accordance with the invention, having through-apertures for the differential gears.

FIG. 4 illustrates a fourth embodiment of a differential carrier of a differential drive with bearing in accordance with the invention, having blind holes for the output and differential gears bored from one end.

FIG. 5 shows a fifth embodiment of a differential carrier of a differential drive with bearing in accordance with the invention, having blind holes for the output and differential gears bored from one end.

DETAILED DESCRIPTION OF THE PREFERRED EMBODIMENTS

The figures all show a differential carrier 1 with a substantially cylindrical shape, having a flange 2 with a bolted on crown wheel 3. The tooth forces of a pinion (not illustrated) which act thereon, at one point comprise an axial and a radial component.

In the differential carrier, two output gears 4, 5 are radially supported at one end with their teeth in cylindrical apertures 6, 7 in the differential carrier 1 and in bevel roller bearings 8, 9 (FIGS. 1 to 3) at the other end. Output shafts 24, 25 are non-rotatingly inserted into the output gears 4, 5. In FIG. 1, the output gear 4, via a needle bearing 26, is supported in a sleeve 27 which is pressed into the differential carrier 1.

In FIGS. 4 and 5, the second bevel roller bearing 9 is at the differential located directly on a projection 10 at the differential carrier. In this case, only one continuous inner aperture 7 is bored from one end into the differential carrier 1 with a spacing sleeve 11 inserted between the output gears 4, 5.

Differential gears 12 of a first group engage the output gear 4. Differential gears 13 of a second group engage output gear 5. The differential gears 12, 13 are circumferentially distributed in the differential carrier with each differential gear of the one group circumferentially engaging at least one of the differential gears of the other group. The cylindrical bores 14 for the differential gears 12 and the cylindrical bores 15 for the differential gears 13 have different designs which are described in more detail below.

In FIGS. 1 and 2, the apertures 14, 15 are blind holes which are introduced into the carrier 1 from opposite ends. Axial security of the identical differential gears 12, 13 is provided via discs 16, 17 attached on the output gears 4, 5 by security rings 18, 19 (FIG. 1) or via annular discs 20, 21 directly inserted into the differential carrier and attached thereto by welding (FIG. 2).

In FIG. 3, the bores 14, 15 are designed as through-apertures, with axial security being ensured by discs 16, 17 and securing rings 18, 19, as in FIG. 1. In this case, the differential gears 12, 13 include journal projections 22, 23 which are in the form of spacers to bridge the distance between the end of the toothed region and the opposite disc.

In FIG. 4, the bores 14, 15 are designed as blind holes of different depths introduced from one end of the carrier. The differential gears 13 are introduced into the deeper blind holes 15. The gears 13 include the journal projections 23.

In FIG. 5, the bores 14, 15 are designed as blind holes of identical depth introduced from one end of the carrier. The differential gears 12, 13 are each provided with journal projections 22, 23.

While the above detailed description describes the preferred embodiment of the present invention, the invention is susceptible to modification, variation, and alteration without deviating from the scope and fair meaning of the subjoined claims.

What is claimed is:

1. A differential drive comprising:
   a drive housing;
   a differential carrier rotatably supported in said housing;
   a pair of toothed output gears each including an output means, said output gears retained in said differential carrier and said output means being co-axially positioned in said differential carrier;
   a first group of differential gears positioned parallel with the differential carrier axis and engaging one of said output gears;
   a second group of differential gears positioned parallel with the differential carrier axis and engaging the other of said output gears; and
   support means for indirectly supporting said differential carrier in that said differential carrier is radially floatingly held on said output gears with the teeth of the output gears holding the differential carrier by contact with the cylindrical apertures therein, said support means associated with said output means and said support means including bearing means associated with said output means and externally positioned outside of said differential carrier and being held in said drive housing.

2. A differential drive according to claim 1 wherein said differential gears are axially outwardly supported against withdrawal from the differential carrier by annular discs attached on the output gears.

3. A differential drive according to claim 2, characterized in that the apertures (14, 15) for receiving the differential gears (12, 13) are designed as blind holes introduced from both ends of the differential carrier (1).

4. A differential drive according to claim 2, characterized in that the apertures (14, 15) for receiving the differential gears (12, 13) are designed as blind holes, especially of differential depths, introduced from one end of the differential carrier (1).

5. A differential drive according to claim 2, characterized in that at least one of the output gears (4) or one of the output shafts (24) connected thereto is supported in the differential carrier (1) or the respective other output gear (5), via a needle bearing (26).

6. A differential drive according to claim 2, characterized in that helical teeth at the output and differential gears are designed in such a way that, under normal operating conditions, the axial component of the tooth forces, acting on the output gears is directed axially inwardly with respect to the differential carrier and that, in the case of torque reversal, the axial component of the tooth forces acting on the output gears is directed outwardly with respect to the differential carrier so as to have a friction reducing effect on the bearings.

7. A differential drive according to claim 1 wherein said differential gears are axially outwardly supported against withdrawal from the differential carrier by annular discs directly attached to the differential carrier.

8. A differential drive according to claim 7, characterized in that the apertures (14, 15) for receiving the differential gears (12, 13) are designed as blind holes introduced from both ends of the differential carrier (1).

9. A differential drive according to claim 7, characterized in that the apertures (14, 15) for receiving the differential gears (12, 13) are designed as blind holes, especially of different depths, introduced from one end of the differential carrier (1).

10. A differential drive according to claim 7, characterized in that at least one of the output gears (4) or one of the output shafts (24) connected thereto is supported in the differential carrier (1) or the respective other output gear (5), via a needle bearing (26).

11. A differential drive according to claim 7, characterized in that helical teeth at the output and differential gears are designed in such a way that, under normal operating conditions, the axial component of the tooth forces acting on the output gears is directed axially inwardly with respect to the differential carrier and that, in the case of torque reversal, the axial component of the tooth forces acting on the output gears is directed outwardly with respect to the differential carrier so as to have a friction reducing effect on the bearings.

12. A differential drive according to claim 1 wherein a needle bearing is positioned and supported in said carrier and supports said output gears or said output means connected thereto.

13. A differential drive according to claim 12, characterized in that the differential gears (12, 13) are axially outwardly supported against withdrawal from the differential carrier by the annular discs (16, 17) fixed to the output gears (4, 5).

14. A differential drive according to claim 12, characterized in that the differential gears (12, 13) are axially outwardly supported against withdrawal from the differential carrier by the annular discs (16, 17) fixed to the output gears (4, 5).

15. A differential drive according to claim 12, characterized in that the differential gears (12, 13) are axially outwardly supported against withdrawal from the differential carrier by the annular discs (20, 21) inserted into the differential carrier (1).

16. A differential drive according to claim 12, characterized in that the differential gears (12, 13) are axially outwardly supported against withdrawal from the differential carrier by the annular discs (20, 21) inserted into the differential carrier (1).

17. A differential drive according to claim 12, characterized in that at least one of the output gears (4) or one of the output shafts (24) connected thereto is supported in the differential carrier (1) or the respective other output gear (5), via a needle bearing (26).

18. A differential drive according to claim 12, characterized in that helical teeth at the output and differential gears are designed in such a way that, under normal operating conditions, the axial component of the tooth forces acting on the output gears is directed axially inwardly with respect to the differential carrier and that, in the case of torque reversal, the axial component of the tooth forces acting on the output gears is directed outwardly with respect to the differential carrier so as to have a friction reducing effect on the bearings.

19. A differential drive according to claim 1 wherein at least one of said output gears is helically toothed, under normal operating conditions, including an axial component of the tooth forces acting on the output gear directed axially inwardly with respect to the differential carrier and, in the case of torque reversal, the axial component of the tooth forces acting on the output gear is directed outwardly with respect to the differential carrier so as to have a friction reducing effect on said differential carrier.

20. A differential drive according to claim 19, characterized in that at least one of the output gears (4) or one of the output shafts (24) connected thereto is supported in the differential carrier (1) or the respective other output gear (5), via a needle bearing (26).

21. A differential drive according to claim 1 wherein apertures are formed in said carrier (14, 15) for receiving the differential gears (12, 13), said apertures are designed as through-holes in the differential carrier (1).

22. A differential drive according to claim 21, characterized in that at least one of the output gears (4) or one of the output shafts (24) connected thereto is supported in the differential carrier (1) or the respective other output gear (5), via a needle bearing (26).

* * * * *